United States Patent Office 3,122,394
Patented Feb. 25, 1964

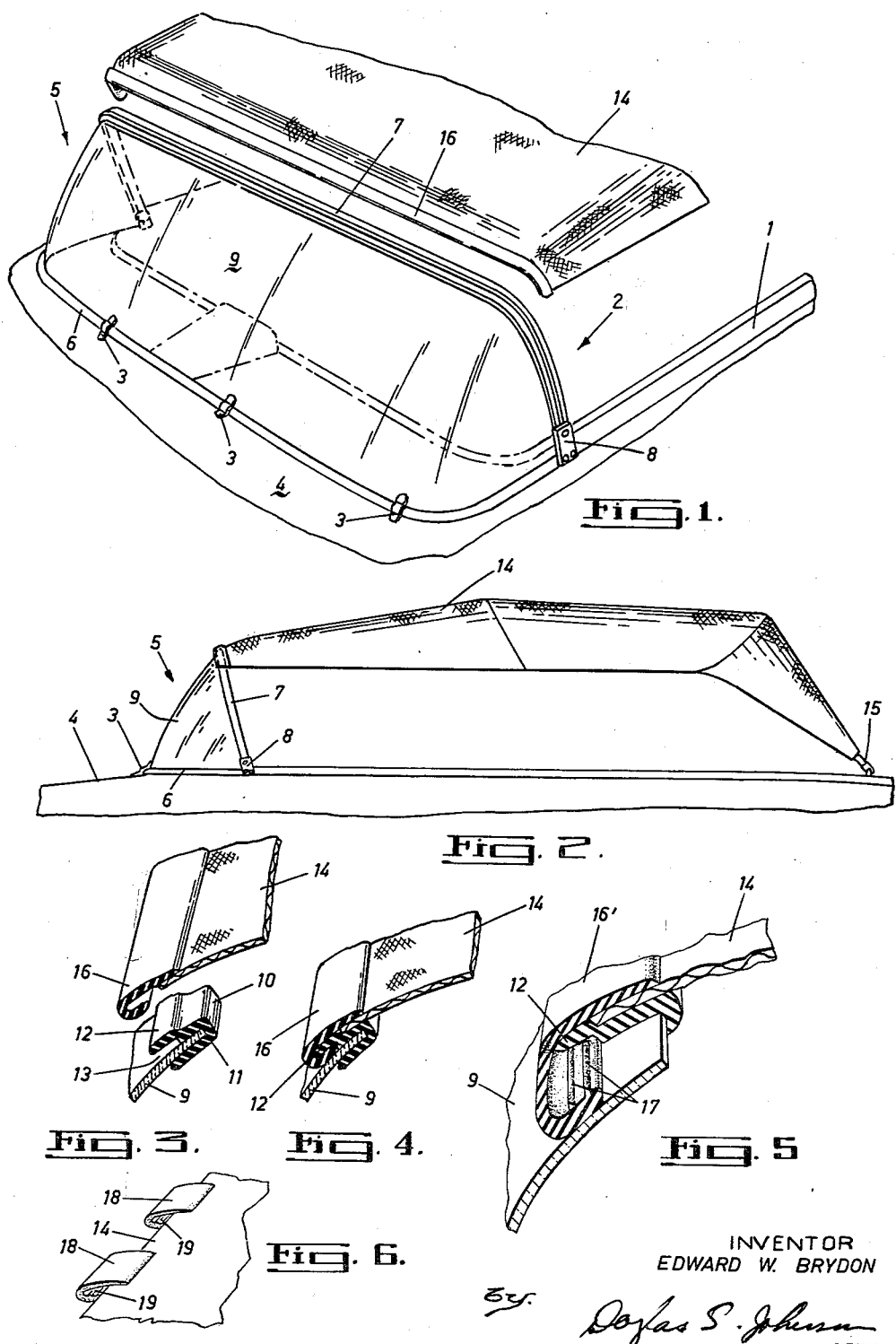

3,122,394
CONVERTIBLE TOP INTERLOCK
Edward W. Brydon, 1341 Steavebank Road N., Port Credit, Ontario, Canada; Vera May Brydon, executor of said Edward W. Brydon, deceased
Filed June 13, 1960, Ser. No. 35,533
6 Claims. (Cl. 296—120)

This invention relates to improvements in the means of interconnecting retractible or removable flexible tops or covers and rigid structures such as windshields, the invention having particular application to the interconnection between convertible tops, side curtains, and the like, and the windshields of boats and the like.

The principal object of the invention is to provide a flexible top or cover to windshield connection which will be extremely simple to operate, will provide a highly reliable coupling between the top and windshield safe against accidental dislodgement, yet will be capable of instant uncoupling with a minimum of effort.

Another and important object is to eliminate the necessity for the use of all unsightly and unreliable fasteners such as dome fasteners, buttons and the like and to provide a coupling which will in no way detract from but will enhance the appearance of the windshield and top or cover. In this connection it is an object to provide a coupling which will be capable of being produced in colours or shades to harmonize with the windshield and cover or top members.

Still another object is to provide a coupling as aforesaid which will in no way interfere with visibility.

Again, it is an important object to enable the top to windshield interlock to be effectively made without any misalignment problems irrespective of the configuration which the windshield assumes in conforming to the deck crown of the boat on which it is installed.

The principal feature of the invention resides in providing the windshield with an interlock member which extends continuously along the top or free edge thereof and providing the flexible top or cover with co-operating interlock means adapted to removably interlock with the windshield interlock member at whatever point along the latter's length registration of the windshield and top interlock occurs.

Another important feature resides in providing the top interlock means with a measure of flexibility to enable same to conform to and interlockingly engage with the windshield interlock member irrespective of the variations in the configuration thereof due to windshield configurations or distortions in fitting different boats having different deck crowns.

More particularly, according to the invention, the top or free edge of a windshield is provided with a continuous forwardly and downwardly opening channel formation and the front edge of the top cover, or side curtain is provided with mating channel interlock means opening towards the rear of the top, the top channel interlock means having sufficient firmness or stiffness to maintain channel formation under top tension when interlocked in the windshield channel, yet having sufficient flexibility or pliability to conform to the configuration of the channel carrying windshield edge whereby the top interlock means is adapted to be easily and quickly introduced into the windshield edge channel to interlock therewith and to be retained therein under the tension of the top and at the same time is adapted to be quickly and easily removed from the windshield channel when it is desired to retract the top.

Further, according to the invention, while the top interlock means preferably comprises a continuous channel formation, it may also comprise a series of separate channel like interlock members or locking hooks.

It will be understood that the windshield channel may, if desired, extend down the sides of the windshield and the top may also be of sufficient width to extend partially down the sides of the windshield and in accordance with the invention the top interlock means will have sufficient flexibility to conform around the curve of the windshield edge at the sides of the windshield without sacrificing its resistance to maintain the channel configuration on interlock.

Preferably, according to the invention, the windshield channel may be formed as an integral part of the windshield edge moulding which supports the transparent material of the windshield.

These and other objects and features will become apparent from the following detailed description taken in conjunction with the accompanying drawings, in which FIGURE 1 is a perspective view partly broken away showing a windshield and convertible top provided with interlocking channel formations according to the invention with the top about to be interlocked with the windshield;

FIGURE 2 is a longitudinal broken away side elevational view showing the windshield and top interlocked;

FIGURE 3 is a fragmented broken away perspective view on an enlarged scale showing the channel formation of the top about to be inserted into the channel formation of the windshield;

FIGURE 4 is a view similar to FIGURE 3 but showing the top and windshield channels interlocked;

FIGURE 5 is a view similar to FIGURE 4 but showing a modified form of the top channel formation; and FIGURE 6 is a fragmented broken away perspective view of a modified form of top interlock wherein the continuous top channel interlock member has been replaced by a series of individual channel like interlock members.

With reference to FIGURES 1 and 2 there is shown the hull or body 1 of a boat or the like having a cockpit 2 and having secured as by clamps 3 to the deck 4 a wraparound windshield 5. The windshield 5 has a wide U-form bottom mounting edge formation 6 and a corresponding wide U-form top and side edge formation 7 with the ends of the bottom and top and side edge formations being joined as at 8. Supported between these edge formations 6 and 7 is a windshield material 9 which may be of plastic such as Plexiglas or other suitable transparent material which can be formed into the compoundly curved formation illustrated.

The top and side edge formation 7 is preferably in the form of a moulding 10 which has a first channel section 11 receiving the upper and side edges of the windshield 9. Forwardly of the first channel section 11 the moulding has an offset leg portion 12 which forms a second channel section 13 defined between the leg 12 and the windshield 9. This channel section 13 is located on the exterior of the windshield 9 and opens forwardly. Across the top of the windshield channel 13 will open forwardly and downwardly.

Suitably secured to the hull or body 1 is a flexible top 14 of canvas, nylon or the like, which has the usual mounting frame 15 which will embody the various collapsing frame members (not shown) presently used. Cemented, stitched, clamped, or otherwise suitably secured to the forward edge of the top 14 is a channel formation 16 formed of a suitable material such as a suitable vinyl and this channel has the characteristics that it will hold its general channel-shaped cross-section upon the application of normal tension on the top when it interlocks with the channel formation 13 of the windshield moulding 10 as shown in FIGURE 4, yet at the same time will have sufficient flexibility that it can be conformed to the configuration of the top edge of the windshield 9 and its supporting moulding 10 across the top of the windshield and preferably at least part way down the sides of the windshield.

It will be noted that because of the wrap-around configuration of the windshield the top channel formation 16 must conform to a compound curve at each side of the windshield. Further, since the crown of the deck of boats varies from boat to boat, the actual configuration of the top edge itself of the windshield will vary in accordance with the crowning of the deck of the boat, with the result that until the windshield is installed, the precise configuration of the top and side edges of the windshield is unknown. Because of these factors, the alignment of conventional dome fasteners and the like used in coupling convertible boat tops to the windshield cannot be precisely predetermined with the result of frequent occurrence of misalignment and it is one of the important aspects of the present invention that not only the unsightly appearance of such fasteners is dispensed with, but that due to the flexibility of the top channel formation 16 this top channel formation can be conformed into interlock with the windshield channel formation 13 irrespective of the configuration of the latter channel.

The moulding 10 which presents the channel formation 13 in conjunction with the windshield 9 may be of any suitable material which preferably will present a measure of resiliency to allow the conformation of windshield to the deck crown without straining the windshield 9. For instance, the windshield channel formation or moulding 10 may be formed of a suitable plastic such as sold under the trademark "Cycolac," although it will be understood that other materials such as aluminum or brass or other plastics may be used.

By forming the top channel formation 16 of a suitable plastic such as a vinyl, there is provided a measure of gripping due to the relatively high coefficient of friction of the material in flexible form which will assist in retaining the channels in interlocked relation as shown in FIGURE 4 when channel 16 is inserted into channel formation 13. At the same time, the channel formation 16 will have sufficient resistance to deformation out of channel form to prevent pulling out of the channel formation 13 under normal tensions experienced in the usual operation of the top. Again by forming the moulding 10 of a plastic having at least a moderate coefficient of friction, the gripping action between the channels is augmented.

While the interlock provided between the channel formation 16 and the channel formation 13 will be sufficient to hold the top in interlocked relationship with the windshield in normal top operation, the flexible nature of the top and as well the degree of flexibility present in the channel formation 16 attached to the top will be such that a forward pulling at the front edge of the top will be sufficient to pull channel formation 16 out of the channel formation 13 to release the top.

By forming the channel formation 16 of, for instance, a suitable plastic, the front edge of the top may be coloured or dyed to any desired colour to enhance the appearance of the top, further improving the appearance over the usual fastener elements.

In FIGURE 5 there is a slightly modified form of the invention illustrated in which the channel formation 16' secured to the flexible top 14 is provided interiorly of the channel with ribs 17 which will add to the resistance of the channel out of channel form and at the same time will provide a gripping action with the channel formation 13 of the windshield moulding.

While the employment of a continuous top channel 16 or 16' is preferred from the standpoint that a continuous weather and watertight interlocking seal is provided across the entire top of the windshield and even partially down the sides, the top can still be adequately interlocked with the windshield by means of a plurality of short interlocking members 18 as shown in FIGURE 6. These short interlocking members 18 are preferably formed of the same material and have the same general cross-sectional configuration as the channel 16 and to augment their gripping action they are preferably provided with the interior gripping ribs 19 as illustrated in FIGURE 6. It will be understood that due to the existence of the continuous interlock channel member 11 on the windshield and the conformability of the series of individual interlocks 18 which simulate hooks, these interlocks 18 can be interlocked with the channel 11 irrespective of where they engage the channel and there is therefore again no problem of registration as in the case of dome fasteners and the like.

While the invention has been particularly described with reference to a convertible top and windshield it will also be obvious that it will be equally applicable to retractible side curtains, covers or other installations.

It will also be understood that various modifications and alterations and substitution of materials may be made without departing from the spirit of the invention or scope of the appended claims.

What I claim as my invention is:

1. In combination a windshield having secured to the upper edge thereof a channel formation opening forwardly and downwardly below the upper edge of said windshield, and a flexible top having at its forward edge a channel formation opening towards the rear of the top and adapted to wedgedly and frictionally interlock between said windshield channel formation and said windshield, said top channel formation having at least a degree of flexibility in a longitudinal direction to conform along the windshield edge and being yieldable to engage said windshield under pressure without scoring said windshield.

2. The combination as claimed in claim 1 in which said top channel formation is provided with at least one longitudinally extending internal reinforcing rib formation.

3. The combination as claimed in claim 1 in which said windshield channel comprises a channel-shaped member having a first inner narrow channel formation adapted to receive the upper edge of a transparent windshield material to support same, and an offset leg portion defining a second outer wider channel formation, said offset leg portion defining with said transparent windshield material a channel formation of a width to receive said top channel formation.

4. The combination of a wrap-around windshield having a wide U bottom mounting edge formation, a wide U top and side edge formation, the ends of which join the ends of the bottom edge and a compoundly curved transparent windshield material secured between said edge formation, said top and side edge formation presenting a channel formation opening forwardly and along the top of the windshield downwardly of the windshield material and being presented at the exterior of the windshield and a flexible top adapted to co-act with said windshield and having along its forward edge a flexible channel formation opening towards the rear of said top and adapted to conform and follow throughout the width of said top said windshield top and side edge configuration, said top channel being adapted to be inserted into said windshield top and side edge channel formation to be wedged between said latter edge formation and said transparent windshield material, said top channel being resistant to deformation out of channel form and having a measure of compressibility to contact said windshield material under pressure without scoring said windshield material.

5. The combination as claimed in claim 4 in which said top channel formation has a series of interior reinforcing and gripping rib formations.

6. The combination as claimed in claim 4 in which said windshield top and side edge formation comprises a channel member having an inner channel formation to receive and support the corresponding edge of said transparent windshield material and an offset leg portion defining with said transparent windshield material said channel formation presented exteriorly of said windshield material.

References Cited in the file of this patent

UNITED STATES PATENTS

| | | |
|---|---|---|
| 2,305,715 | Keller | Dec. 22, 1942 |
| 2,572,592 | Brandt et al. | Oct. 23, 1951 |
| 2,937,652 | Zimmer et al. | May 24, 1960 |
| 2,961,725 | McGee | Nov. 29, 1960 |

FOREIGN PATENTS

| | | |
|---|---|---|
| 625,871 | France | May 2, 1927 |
| 314,619 | Italy | Feb. 1, 1934 |
| 501,252 | Italy | Nov. 23, 1954 |